Feb. 14, 1950 E. BRAMSON 2,497,655
EGG CANDLING MACHINE
Filed Sept. 24, 1948 9 Sheets-Sheet 1
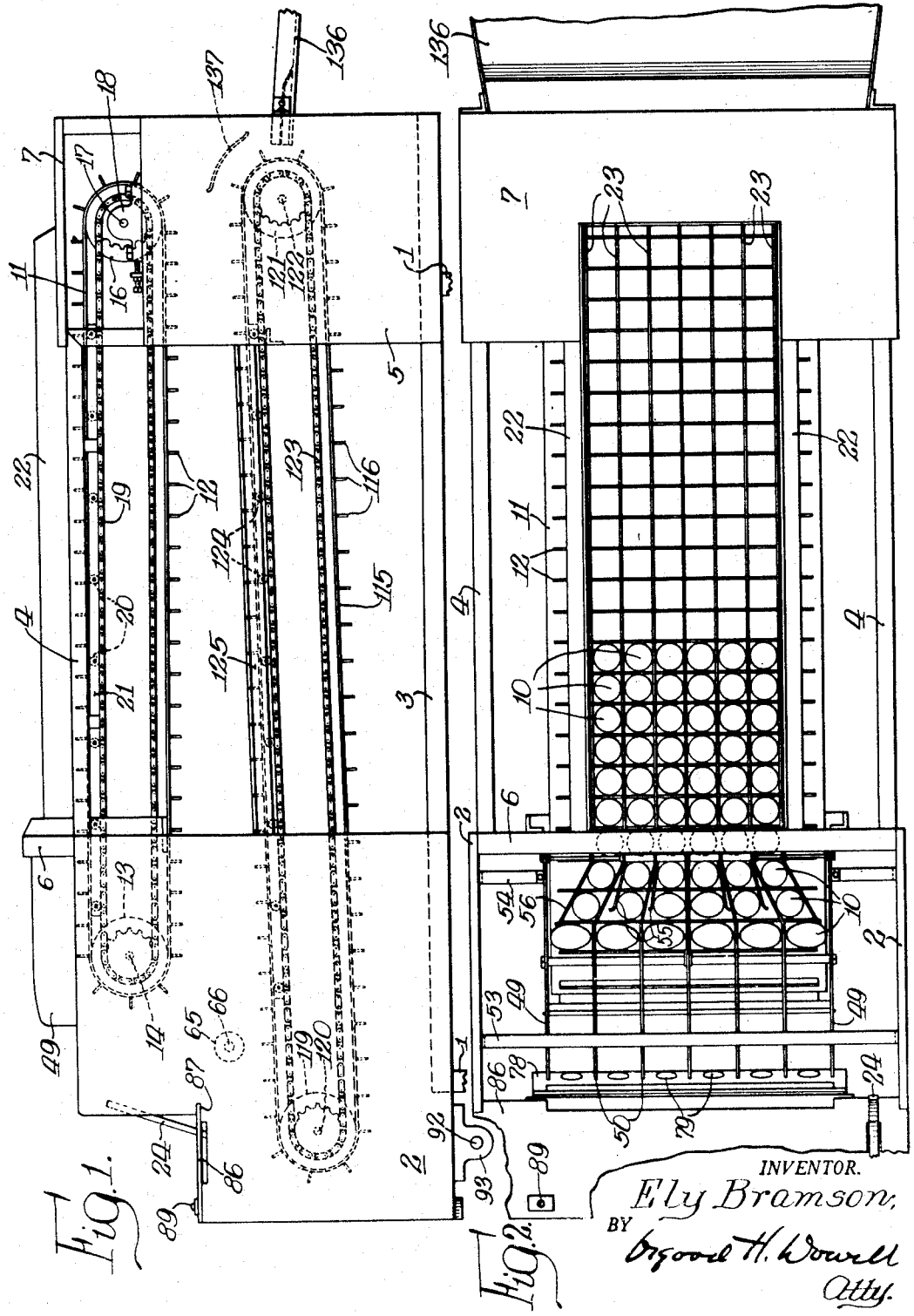
INVENTOR.
Ely Bramson,
BY
Osgood H. Dowell
Atty.

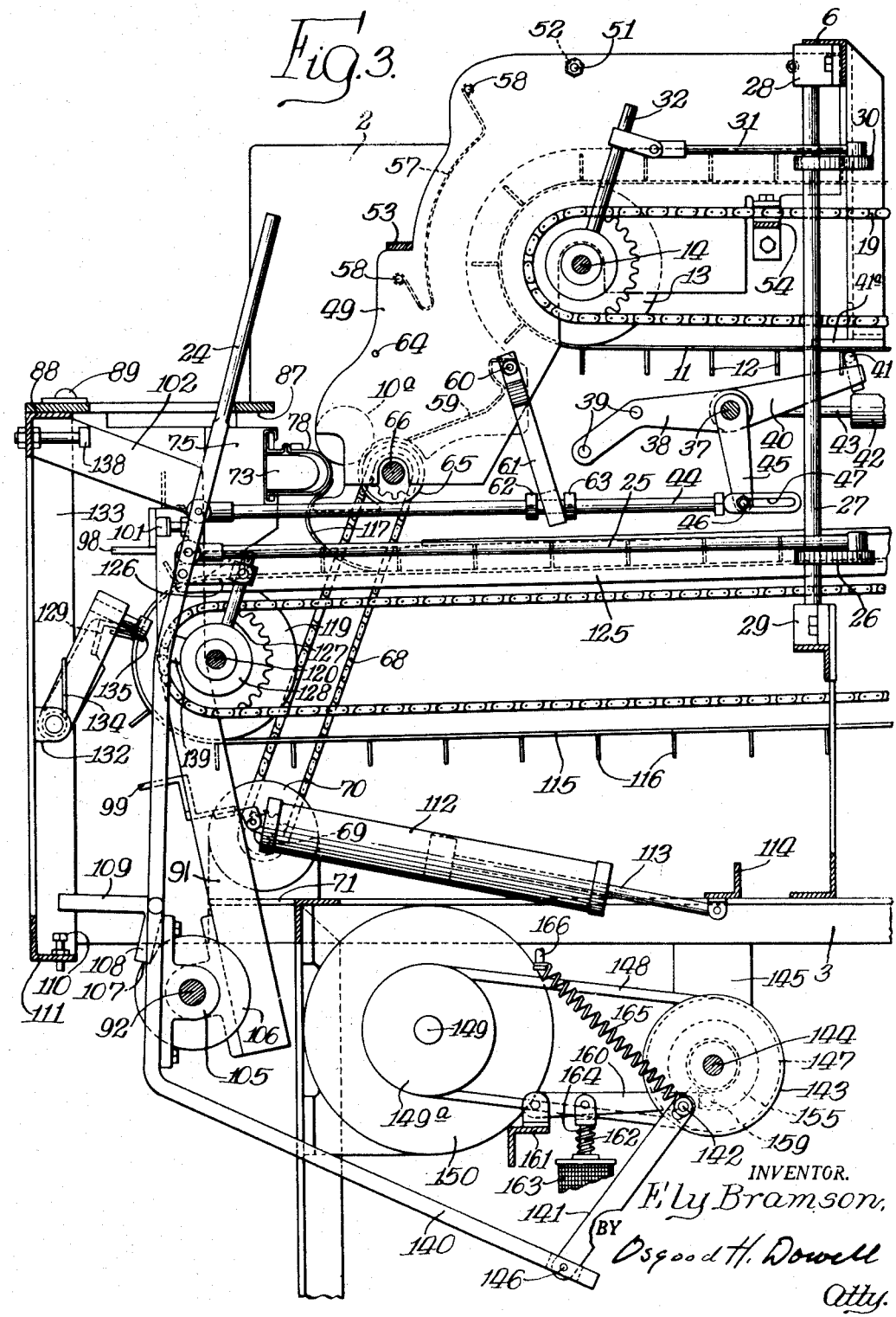

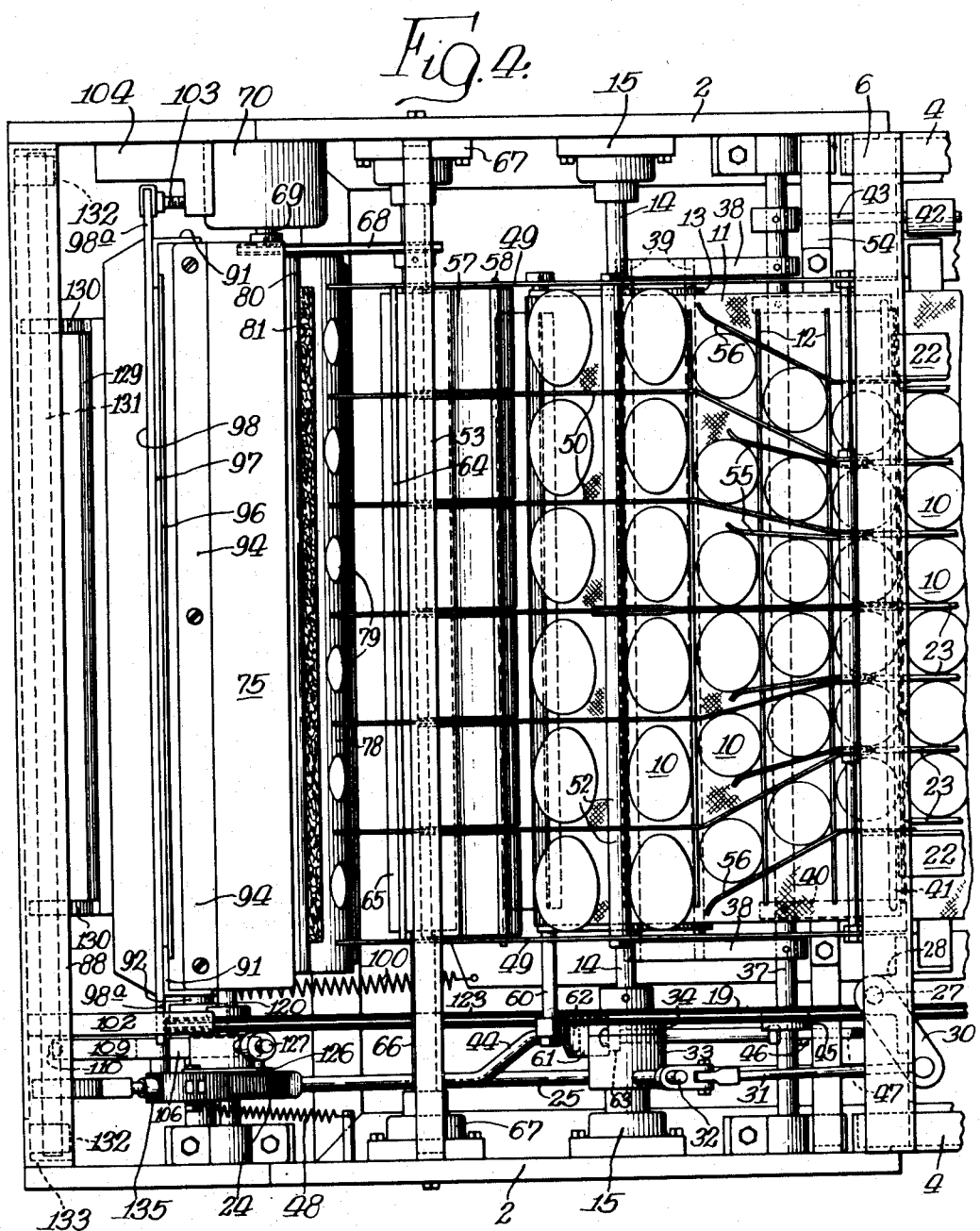

Feb. 14, 1950 E. BRAMSON 2,497,655
EGG CANDLING MACHINE
Filed Sept. 24, 1948 9 Sheets-Sheet 5
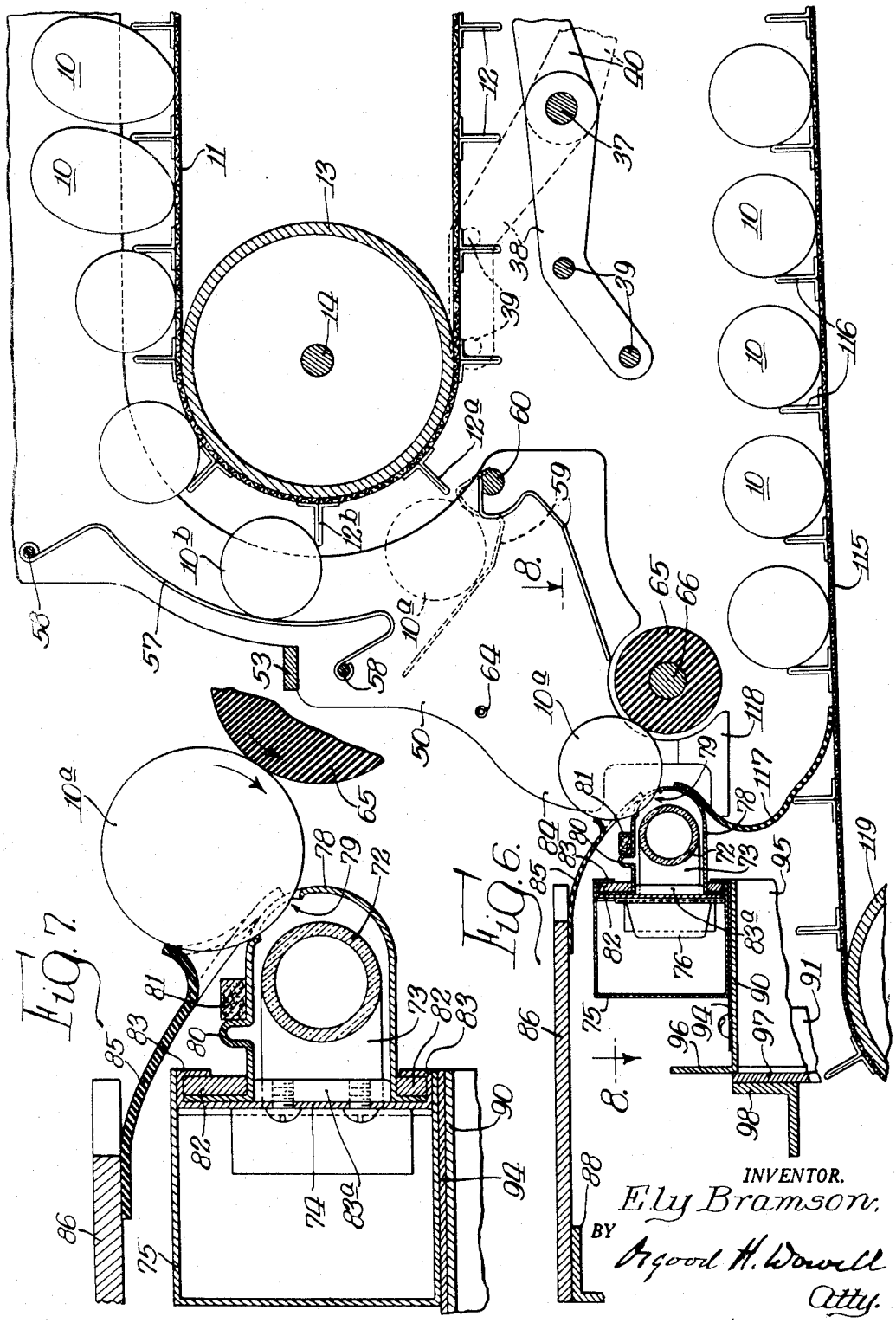
INVENTOR.
Ely Bramson,
BY Osgood H. Dowell
Atty.

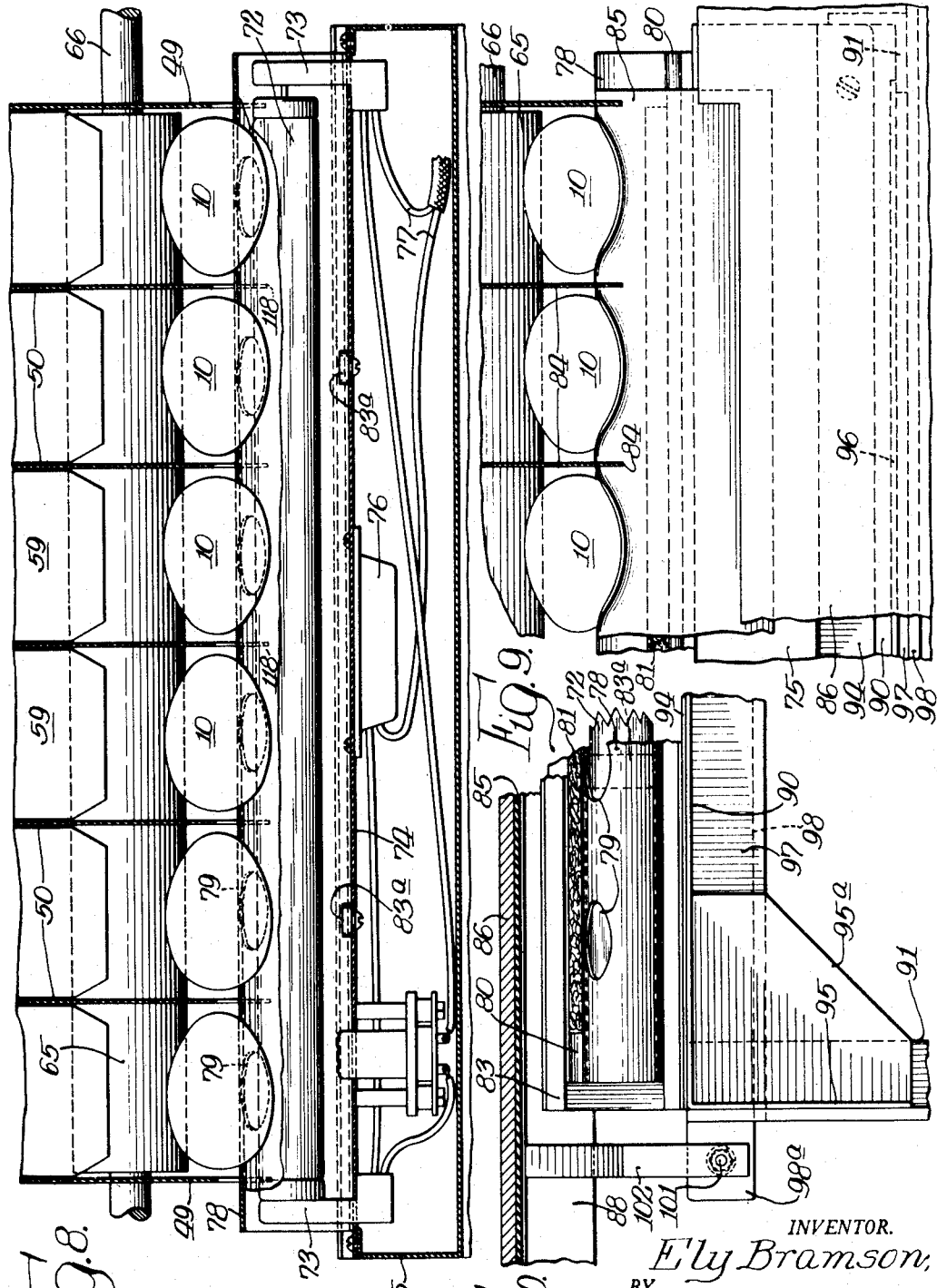

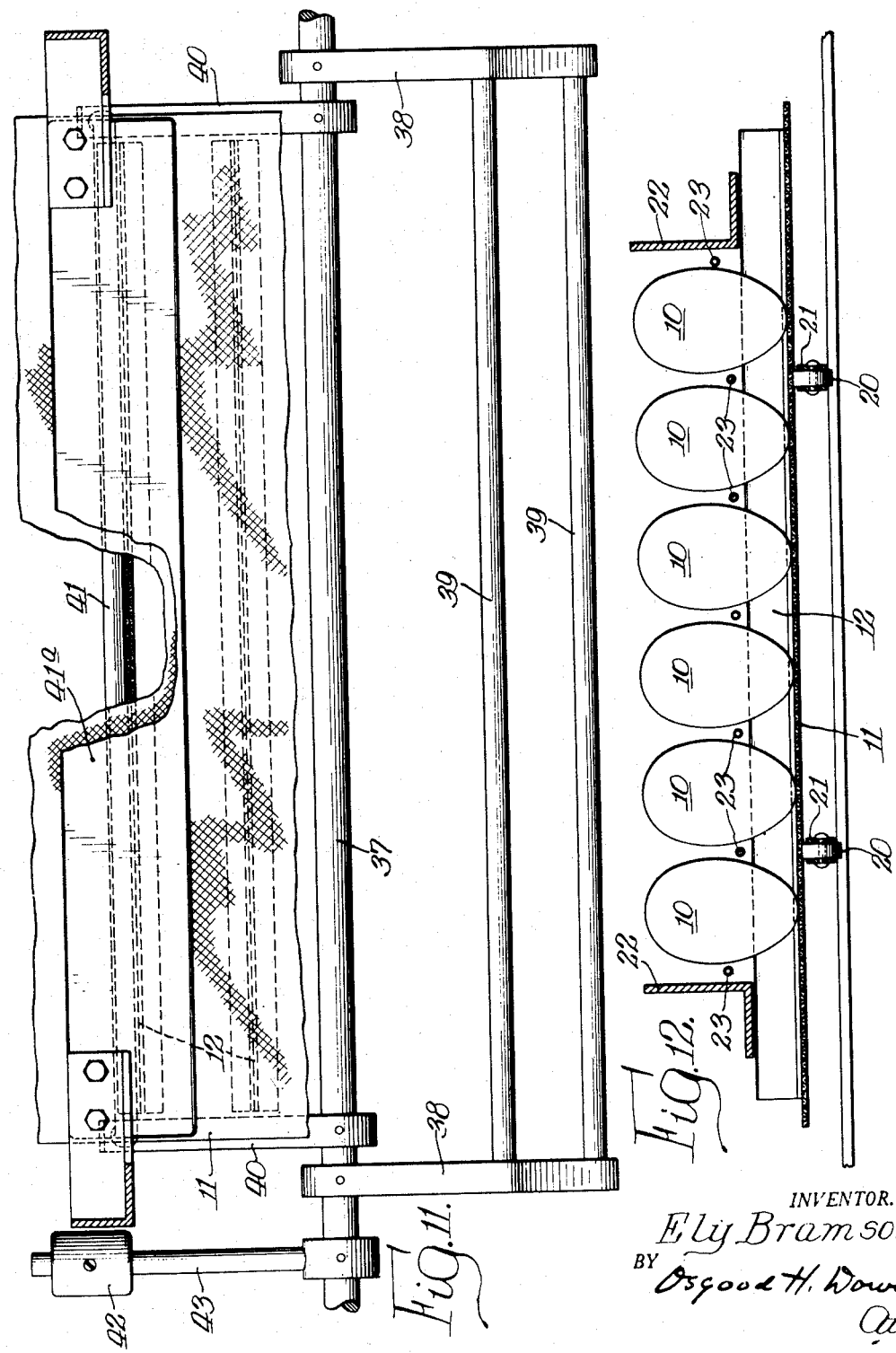

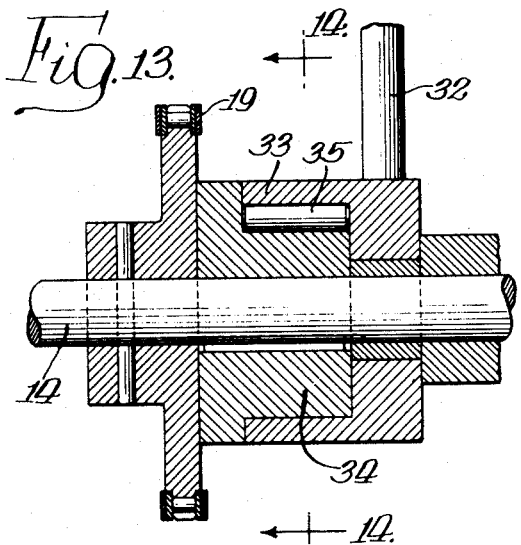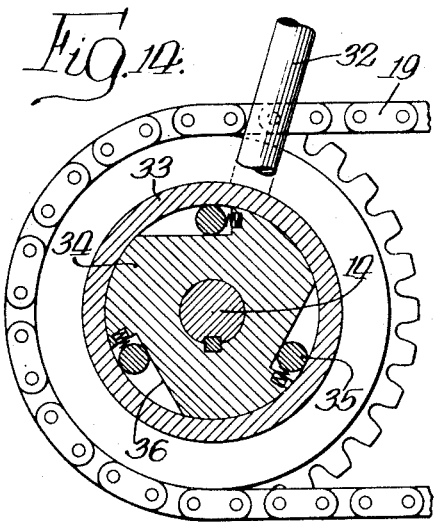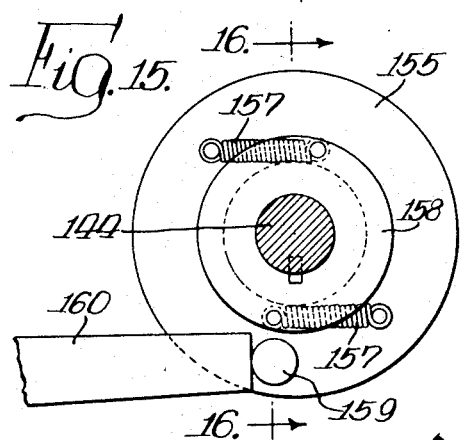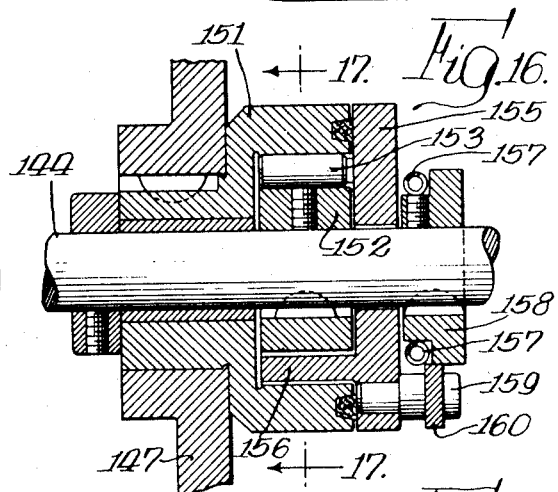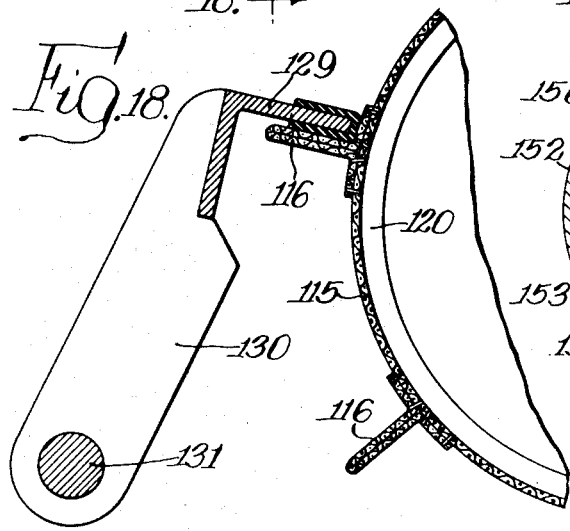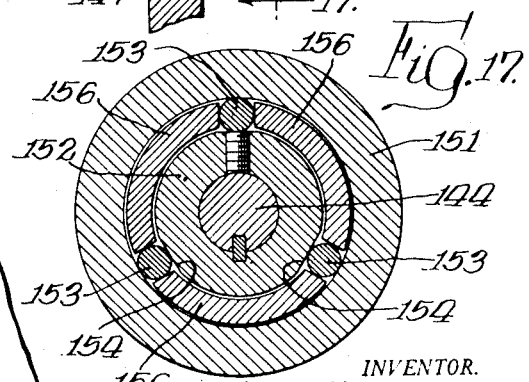

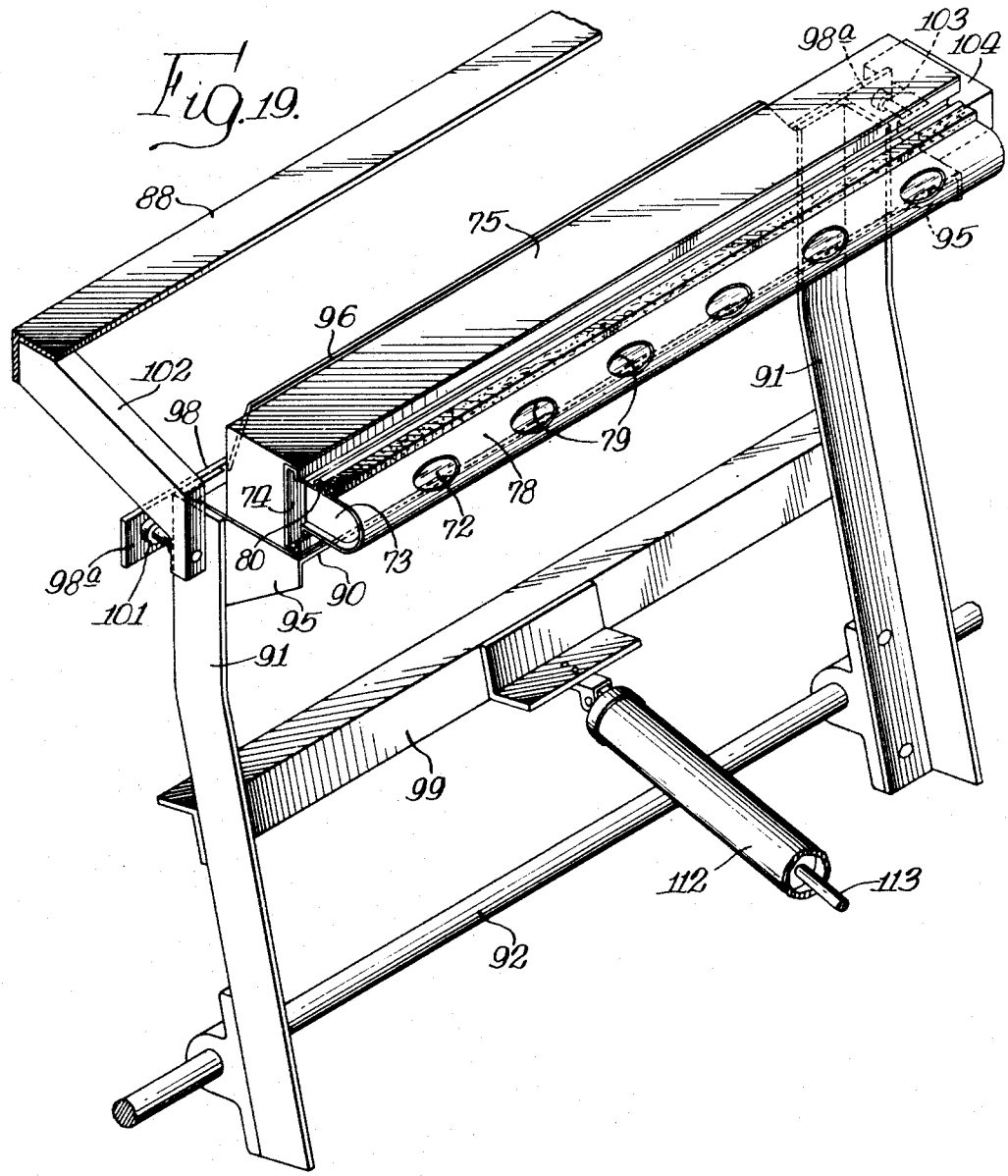

Patented Feb. 14, 1950

2,497,655

UNITED STATES PATENT OFFICE 2,497,655

EGG CANDLING MACHINE

Ely Bramson, Chicago, Ill.

Application September 24, 1948, Serial No. 51,069

29 Claims. (Cl. 88—14.5)

This invention relates to machines for use in candling eggs.

Candling consists in examining eggs while held between the eye and a source of light or while illuminated by light projected through the eggs, such examination being conducted in a darkened room. As is well known, eggs incipiently or partially affected by decomposition, as in cases of small black rots, blood rots and blood rings, will in illuminated condition reveal the affected portions as dark patches or circles. Air cells which form in merchantable eggs not strictly fresh, and the sizes of which are indicative of the age of the eggs, appear under illumination as light rings. Imperfections in egg shells such as small pin holes, fine cracks or fissures and weak shell formations which would allow air to enter the eggs and cause deterioration, are readily discernible in illuminated eggs.

By careful inspection of highly illuminated eggs, the age, condition and characteristics of the eggs can be ascertained. Candling is extensively practiced in connection with the grading of eggs for merchandising and the selecting of eggs for special purposes in egg-processing plants and cold storage plants. Also in hatcheries eggs after partial incubation are tested by candling for presence or absence of live embryos. However, under many conditions of practice, with the use of apparatus or machines for handling the eggs and supporting them for candling, light rings and other indicia of imperfection often escape the candler's observation.

An object of the present invention is to provide a machine which will receive eggs and present them in highly illuminated condition to the view of the candler in a manner to allow and promote thorough and reliable candling of the idividual eggs. A further object is to provide a machine by the use of which the work of candling a large quantity of eggs can be carried on expeditiously as well as efficiently.

Further objects more or less ancillary or subsidiary to the foregoing will be understood from the following description with reference to the accompanying drawings, wherein there is shown for illustration an egg candling machine of one practicable construction embodying the invention.

In said drawings:

Fig. 1 is a side elevation of the illustrative machine, omitting the underframing thereof and a motor-actuated means supported by such underframing for motor-operation of the machine.

Fig. 2 is a top plan view of said machine, omitting the showing of operating connections arranged at the inner sides of the machine frame, which connections are shown in Figs. 3, 4 and 5.

Fig. 3 is a longitudinal vertical section of the front portion of said machine, taken just inside of the side of the machine frame next the observer, and showing the principal parts of the machine in side elevation.

Fig. 4 is a top plan view of said front portion of the machine, omitting a removable cover plate at the front end of the machine which when in place covers the lamp-supporting structure.

Fig. 6 is an enlarged longitudinal vertical section of the front portion of the machine, showing the candling support and adjacent parts of conveyers associated therewith, one for receiving eggs to be candled for delivery to the candling support and the other for carrying off eggs discharged from said support.

Fig. 7 is an enlarged part of Fig. 6, comprising a showing in section of said candling support.

Fig. 8 is a horizontal section taken on the line 8—8 of Fig. 6, showing a plan of said candling support.

Fig. 9 is a partial plan view of said candling support as seen when the removable cover plate aforesaid is in place, which cover plate conceals the lamp and its supporting structure.

Fig. 10 is a detail view showing a portion of the lamp support and shiftable carrier therefor, looking from a point behind the same toward the front end of the machine, and showing the portion of the lamp housing which is adjacent to and confronts the roller 65.

Fig. 11 is a detail plan view showing a portion of the lower run of the receiving conveyer belt and associated stop mechanism.

Fig. 12 is a transverse section of the upper run of the conveyer belt on which the eggs to be candled are deposited, also showing belt-supporting means, longitudinal guide rails between which the eggs are carried, and longitudinal guides 23 between the longitudinal rows of eggs.

Figs. 13 and 14 show a clutch utilized in driving the driving pulley of the receiving conveyer, Fig. 13 being a section taken longitudinally of the pulley shaft and Fig. 14 being a cross section taken on the line 14—14 of Fig. 13.

Figure 5:
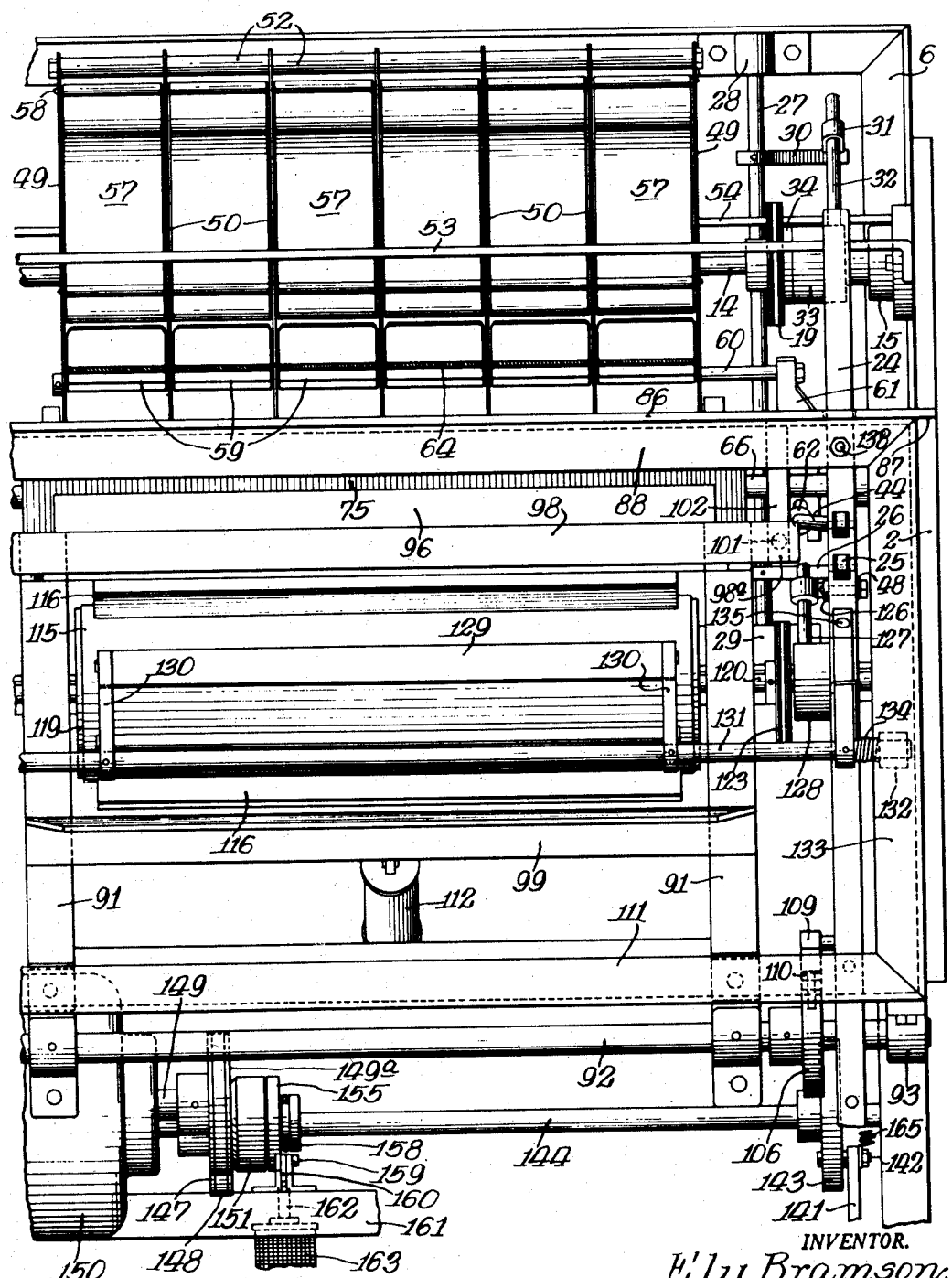
Fig. 5 is a front elevation of the machine, excepting the side of the machine frame at the left side in said figure and certain operating connections adjacent thereto.

Figs. 15, 16 and 17 show an automatically controlled clutch utilized in connection with motor operation of the machine, Fig. 15 being an end view, Fig. 16 a section on the line 16—16 of Fig. 15, and Fig. 17 a section on the line 17—17 of Fig. 16.

Fig. 18 is a detail view showing in section a stop device used with the off-bearing conveyer.

Fig. 19 is a perspective view of a rocker structure carrying the lamp-supporting and housing structure.

The illustrative machine is adapted to receive filler lots of eggs and to be operated by or under control of the candler for presenting the eggs row by row for candling. The lots of eggs to be candled are received upon a conveyer from which rows of eggs are successively delivered in rearranged order and presented in illuminated condition to the view of the operator or candler using the machine, the eggs so presented being held and rotated as hereinafter described upon a candling support of novel character. The machine is operated intermittently or in alternation with rest periods during which the eggs of successively presented rows are candled. In each cycle of operation, occurring between two successive rest periods, the row of eggs previously delivered to the candling support is dropped therefrom to an off-bearing conveyer, and another row of eggs is deposited upon said support. Operation is effected at the will of the candler, who can therefore control the durations of successive rest periods in accordance with the respective times required, whether relatively long or short, for candling the successively presented rows of eggs.

Referring to the drawings, the machine is supported at an appropriate elevation on legs 1 only the upper parts of which are shown. The machine frame shown includes a pair of front side plates 2 connected by longitudinal base bars 3 and top bars 4 to a pair of rear side plates 5. The opposite side members of the frame are connected by various cross bars including a yoke-shaped angle bar 6 connecting the side plates 2 and a rear top plate 7 supported by posts from the rear side plates 5.

Mounted in the front end of the machine between the side plates 2 is the candling support, hereinafter described but here identified as comprising a horizontal motor-driven roller 65 and an associated lamp-supporting and housing structure.

Eggs being handled by the illustrative machine are designated in the drawings by the numeral 10.

The machine receives the eggs upon a conveyer comprising a belt 11, having uniformly spaced transverse ribs 12 between which rows of eggs are supported. A canvas belt having ribs consisting of doubled canvas strips formed with base flanges sewn to the belt may be utilized, such ribs being sufficiently stiff for the purposes hereinafter indicated.

The conveyer belt 11 is movable step by step for successively delivering rows of eggs, each step movement occurring in one cycle of operation. The direction of travel of the belt is forward or toward the front end of the machine, which is the left hand end in Figs. 1 and 2.

The conveyer belt is entrained at its delivery end on a driving pulley consisting of a preferably rubber-covered roll 13 fixed on a shaft 14 mounted in bearings 15 supported by the frame side plates 2. In every cycle of operation an appropriate angular movement is imparted to the pulley 13 for moving the conveyer belt one step. At its opposite end the belt is entrained on a pulley 16 fixed on a shaft 17 mounted in bearings 18 supported by the rear side plates 5, said bearings 18 being adjustable longitudinally of the machine frame for tensioning the belt.

Though the rear belt pulley 16 could be driven by the conveyer belt, it is desirable to relieve the belt from that duty. As shown, the driving pulley 13 is connected with the rear pulley 16 by a sprocket chain 19 engaging sprocket wheels on the shafts of the two pulleys, whereby the rear pulley is driven from the driving pulley 13 by said sprocket chain or by said chain and the belt. Thus the rear pulley 16 assists in driving the belt and the latter is relieved largely if not entirely from drag by said rear pulley.

To prevent sagging of the conveyer belt, under the load of the many eggs carried thereon when the machine is in use, a support for the upper run of the belt is provided by a multitude of appropriately distributed small idle rollers 20 rotatably mounted in longitudinally arranged channel bars 21 carried by supporting cross bars.

The conveyer belt underlies and carries the eggs thereon between a pair of longitudinal guide bars 22 supported at their front ends by the cross bar 6 and at their rear ends by the top plate 7. The space between said guide bars 22 is longitudinally subdivided by a series of parallel guides 23 (Figs. 2 and 12) which separate adjacent eggs of the several transverse rows on the belt. The eggs rest on the belt more or less erect or somewhat as they stand in an ordinary shipping case, though generally they will assume tilted postures, leaning either forward or backward against the belt ribs 12 and laterally against the guides 23. As the conveyer belt suddenly moves and stops, the eggs by their inertia tend to tilt first backwardly and then forwardly, while on the other hand their frictional engagement with the guides 23 tends to hold them erect. The eggs cannot lie on their sides nor tilt laterally beyond the limits allowed by said guides 23, the outermost ones of which are closely adjacent to the guide bars 22.

Said guides 23 consist preferably of covered tensioned spring cords offering substantial resistance to distension, said cords being tightly coiled fine wire coiled springs of small diameter covered by flexible sleeves or sheaths of suitable material slidably fitted on said cords. The coverings utilized are flexible tubes of insulating material such as are commonly used for covering electric wires, these being known as "electric macaroni." Said covered tensioned spring cords constituting the guides 23 are secured at their front and rear ends is fixed relation to the machine frame. As shown, the intermediate cords are affixed at their front end to the hereinafter described guide plates 50 (Fig. 4), while the outer cords adjacent to the bars 22 are attached at their front ends to brackets (not shown) affixed to the machine frame bar 6. The rear ends of the several cords are attached to the top plate 7. The cords are tensioned to render them fairly taut and straight. Deflection of the cords by pressure of eggs leaning against them is resisted by the contractive power of the cords and by their coverings which are substantially less flexible than said cords.

It will be seen that the covered tensioned spring cords constituting the guides 23 cooperate with the conveyor belt ribs 12 to provide individual compartments for the eggs supported on the belt, such compartments being arranged in longitudinal and transverse rows. The relation and proportions of these compartments and the number of compartments per transverse row are such that filler lots of eggs can be deposited one after another upon the conveyer, in successive sets of compartments therefor, by use of a transfer tray such for example as that disclosed in patent to Bramson No. 2,370,122 of February 27, 1945.

By a filler lot is meant the eggs comprising one layer in a compartment of a standard commercial shipping case, or a like number of eggs similarly arranged. Under present commercial practice, such a lot comprises thirty-six eggs arranged in six rows of six eggs each, forming a square. The eggs of each layer in a standard shipping case compartment are contained in the cells of a paper board filler and rests on an underlying paper board flat which is commonly embossed to form seats on which the eggs stand erect. Upon uncovering such a layer and removing the filler therefrom, the filler lot of eggs left standing on the flat can be picked up as a lot and withdrawn from the case by means of a transfer tray of the type aforesaid, which tray can be operated to release the eggs through the tray bottom for depositing the eggs either upon a set of seats therefor or into a receptacle having compartments corresponding to those of a standard filler. Such a transfer tray or other appropriate device for the same purpose is intended to be used with the illustrative machine for taking filler lots of eggs from shipping cases and transferring them to the machine.

As shown, the conveyer belt 11 is adapted to hold a plurality of filler lots of eggs, which can be deposited upon the belt one after another, each lot occupying six transverse rows of compartments formed by the belt ribs 12 and longitudinal guides 23. The belt may be filled up with as many filler lots of eggs as it can hold before beginning the work of candling. During use of the machine for candling, the operator will at appropriate times deposit or cause to be deposited one or more additional filler lots of eggs on the belt. It is desirable to deposit each lot immediately adjacent to the one previously deposited, so that all transverse channels of the belt formed between the ribs 12, as said channels successively arrive at the delivery end of the conveyer, will be occupied by eggs.

The illustrative machine utilizes a master lever 24 as a means to be operated to effect a cycle of operation of the machine. Said lever may be operated under the control of the candler by a motor, as, for example, by means hereinafter described, or it may be disconnected from the means for motor-actuation thereof and operated by hand. It is shown as a long lever for easy hand operation, mounted at the front end of the machine for convenient operation by the candler, in case it is to be operated manually. Said lever is arranged for forward and backward movement between two extreme positions. It is shown in the rearmost position in Figs. 3 and 4. While the lever is in this position, a previously deposited row of eggs rests on the candling support. After the candler has candled the eggs of each row, he shifts or causes the shifting of said lever from its rearmost to its foremost position and back to its rearmost position, or in other words effects a complete reciprocation of said lever, with the result that the said row of eggs is dropped from the candling support, by an operation hereinafter described, and another row of eggs is deposited upon said support, provided of course that rows of eggs are contained in all transverse belt channels as they successively arrive at the point for delivery of the eggs from the belt.

In every reciprocation of the master lever, the driving pulley 13 is partially rotated for advancing the conveyer belt one step. Said pulley is driven from the master lever through a lever 32 pivoted coaxially with said pulley and connected therewith by a clutch of the type to transmit to the pulley the angular motion of said lever 32 in only one direction and to allow free reverse movement thereof. In this instance the arrangement is such that the pulley is driven on the forward stroke of the master lever.

As shown in Figs. 13 and 14, the clutch through which the pulley 13 is driven comprises a driving member 33 loose on the pulley shaft 14 and fitting rotatably on a driven member 34 fast on said shaft, the lever 32 being fixed to said driving member. The driven member has peripheral recesses containing clutch rollers 35, said recesses being formed to provide inclined surfaces 36. Small springs seated in holes therefor in the driven member urge the rollers 35 away from the deepest parts of said recesses. On rotative movement of the lever 32 and clutch member 33 in one direction (counter-clockwise in Fig. 14), the rollers 35 become wedged between said member and the inclined surfaces 36, thus clutching the said members 33 and 34 one to the other by gripping engagement of said rollers therewith. On reverse movement of said lever 32 and clutch member 33 (clockwise in Fig. 14), the rollers 35 move into the deepest part of said recesses and are freed from such gripping engagement, thus declutching 33 from 34 and allowing free reverse movement of said lever 32.

Operative connections between the master lever 24 and the clutch lever 32 are provided as follows: As shown in Figs. 3, 4 and 5, said master lever 24 is connected by a link 25 to an arm 26 fixed on a vertical rocker shaft 27 carried in bearings 28 and 29. Fixed on said vertical rocker shaft is an arm 30 connected by a link 31 to said lever 32. The illustrative operating connections are such that on the forward stroke of the master lever the clutch lever 32 is swung in a counter-clockwise direction, as viewed in Figs. 3 and 14, in which movement said lever 32 is clutched to the pulley 13 as above explained.

In successive cycles of operation, each effected by a complete reciprocation of the master lever, the pulley 13 is driven equal angular distances. Since however the clutch through which said pulley is driven would allow free wheeling thereof in the direction in which it is driven, i. e. in the direction for advancing the conveyer belt, other provision is made to control the movements of the belt and to prevent derangement thereof by excessive or irregular movements under the momentum of the pulley and the load of eggs on the belt. Provision is also made to prevent the belt from being deranged by shifting it by hand either accidentally or intentionally while the machine is at rest, or in other words to prevent the belt from being advanced otherwise than by operation of the master lever.

A condition should be maintained whereby, assuming rows of eggs to be contained in all transverse channels of the belt as they successively approach the point for delivery from the conveyer, every movement of the belt will result in delivery of one and only one row of eggs at about or near a certain place on the driving pulley 13 and in appropriate timed relation to the action of other devices hereinafter described. This desired condition is obtained in the illustrative machine in the following manner. The throw of the lever 32 is such as to impart to the driving pulley 13 an angular movement for advancing the belt one step, and the movements of the belt in successive operating cycles are arrested as the uniformly spaced belt ribs 12 successively arrive at a certain point in their orbit. This is accomplished by suitable stop mechanism, as, for example, that presently to be described, which also prevents the belt from being advanced otherwise than by operation of the master lever. After each stoppage of the belt, the driving pulley 13 if driven a greater angular distance than necessary, will complete its movement while slipping within the belt. Preferably the pulley is driven an angular distance such as to move the belt one full step, but even if it be driven a slightly less angular distance the belt will nevertheless make a full step movement since the pulley, being free wheeling in the direction in which it is driven, will, due to its inertia and that of the loaded belt engaging it, continue to rotate until the movement of the belt is arrested.

Thus successive movements of the belt are for distances respectively equal to the distances between centers of successively adjacent belt ribs 12. As the ribs 12 are substantially uniformly spaced, the belt movements are substantially uniform, each movement being for a distance substantially equal to the distance between centers of adjacent ribs.

An advantage of this manner of control is that slight variations in the spacing of the belt ribs become practically immaterial. Whether the ribs be precisely or only approximately uniformly spaced, the practical effect is the same, in that the successive movements of the belt will bring the transverse channels thereof successively to substantially or approximately the same position relative to the driving pulley, e. g. to the position of the channel containing the row of eggs 10$^b$ in Fig. 6. Hence if rows of eggs be contained in all the channels successively arriving at such position, every movement of the belt will result in delivery therefrom of a single row of eggs at approximately or near a certain place or as the channel containing said row moves from the said position.

The specific stop mechanism now to be described is for the two functions above indicated, i. e. to stop the movements of the conveyor belt 11 as its ribs 12 successively arrive at a certain point in the orbit of the belt, and to prevent derangement of the belt by manually shifting it otherwise than by operation of the master lever 24. Mounted under the lower run of the belt, adjacent to the driving pulley 13, is a rocker structure comprising a transversely disposed rocker shaft 37 (Figs. 3, 4, 6 and 11) having forwardly extending arms 38 carrying a pair of stop rods 39, and rearwardly extending arms 40 carrying a third stop rod 41, all of said rods being parallel with said rocker shaft and in such relation thereto that the conveyor belt can be engaged alternately by the two stop rods 39 and the third rod 41. The stop rods 39 are spaced apart a distance between their centers equal to the distance between the centers of adjacent belt ribs 12. A weight 42 adjustable on an arm 43 fixed to the rocker shaft 37 urges the rocker shaft in a direction for moving the stop rods 39 upwardly towards the conveyor belt. The rocker structure is operated and controlled by operative connections with the master lever 24. While the machine is at rest, the lever 24 being in the rearmost position shown in Fig. 3, the rear stop rod 41 is lodged against the under side of the conveyer belt immediately behind a belt rib 12. The arc of travel of said rod 31 enables it to be swung up behind and against said rib. As the master lever 24 is moved forwardly from its rearmost position, the weight 42 quickly actuates the rocker shaft 37 to swing the stop rod 41 downwardly or away from the belt, thus releasing the belt for movement, and to swing the stop rods 39 upwardly. As said master lever is further moved to its foremost position, said rocker shaft is operated thereby to force the stop rods 39 against the under side of the belt. The design of the rocker structure is such that the stop rods 39 strike the belt substantially simultaneously, said rods being then in a plane parallel with the belt. Said stop rods 39 lodge against the belt respectively behind and in the paths of two adjacent belt ribs 12 and serve to stop the movement of the belt when said ribs abut against said rods.

Each rod 39 may be considered as providing a stop for arresting the movement of the belt when a belt rib 12 reaches a certain point in the orbit of the belt; however it is preferable to employ two stop rods 39 for abutment by two of said ribs, to relieve the strain on each rib. Movement of the belt is stopped by abutment of said two ribs against the rods 39 as the master lever 24 completes or is about to complete its forward stroke. As said lever completes said stroke, the driving pulley 13 may complete its driven movement or continue to rotate by inertia while slipping within the belt. On the reverse or back stroke said lever 24, which occurs while the belt is at rest, the rocker shaft is operated against the force of the weight 42 to swing the stop rods 39 downwardly or away from the belt and swing the rear rod 41 upwardly against the belt to a position immediately behind a belt rib 12, so that movement of the belt by pulling it in a direction to advance the eggs would be prevented by abutment of said rib against said rod 41. Thus derangement of the belt by pulling it in said direction is prevented. Nor could the belt be moved in the reverse direction except by forcibly slipping it on the drivingly-connected belt pulleys, of which the rubber-covered driving pulley 13 is held against reverse rotation by the lever 32 clutch-connected to said driving pulley.

For operating the rocker shaft 37 by the master lever 24, a link 44 pivoted to said lever has a pin-and-slot connection with an arm 45 fixed to and depending from said rocker shaft, said connection being provided by a pin 46 carried by said arm and slidable in a slot 47 in said link. When the master lever 24 is in its rearmost position, the machine being at rest, the rocker structure is held in the position shown in Figs. 3 and 11, with the rear stop rod 41 engaging the conveyer belt, the pin 46 being now in the fore end of the slot 47. The master lever is held steady in its rearmost position by a spring 48. The weight 42 is insufficient to move the rocker structure from the position shown in Figs. 3 and 11 against the resistance of said spring and inertia of the master lever and link 44. As the master lever is shifted forwardly, the weight 42 tilts the rocker structure to swing the stop rod 41 downwardly or away from the belt and to swing the stop rods 39 upwardly while the slotted link 44 moves forwardly relative to the pin 46. When the play between the link and pin is taken up, or in other words when the rear end wall of the slot 47 encounters the pin 46, the continuing forward movement of the master lever will positively force the stop rods 39 against the under side of the belt, whose movement can then continue only until the two belt ribs 12 approaching said rods abut firmly against them.

As shown in said Figs. 3 and 11, a flat plate 41$^a$ under which the conveyer belt runs is arranged to sustain the upward thrust of the stop pin 41, said plate being suitably affixed to and supported from the machine frame.

Reference will now be made to the matter of delivery of eggs from the conveyer and to the candling support.

Mounted over the breast of the driving roll or pulley 13 is a series of longitudinally arranged vertically disposed guide plates 50 arranged between a pair of supporting side plates 49 (Figs. 2 to 8), all of said plates 49 and 50 being connected in spaced relation by tie bolts 51 and spacing sleeves 52 fitted on said tie bolts between the respective plates (Figs. 3 to 5). The guide structure comprising said connected series of plates 49 and 50 is supported from the machine frame by a pair of cross bars 53 and 54, the bar 53 being permanently fixed to the side plates 49 and detachably fastened to the frame side plates 2, and the plates 49 being detachably secured to the cross bar 54, whereby the guide structure is conveniently demountable, the bar 53 being removable therewith.

As best shown in Fig. 6, the intermediate guide plates 50 are shaped to fit over the front and top of the driving roll or pulley 13 and over a portion of the conveyor belt 11 approaching said driving roll. As shown, said plates 50 have curved edges adjacent and conforming to the curvature of the portion of the belt engaging said roll, said plate edges being spaced sufficiently from said roll to allow the belt ribs 12 to travel under and out of contact with said edges. The guide plates 49 and 50 cooperate with the belt to provide over the driving roll and breast thereof a series of guide passages the bottoms of which are formed by the belt, said passages being continuations of the longitudinal guideways provided over the belt by the guides 23. In every cycle of operation, the belt carries a row of eggs into said passages while carrying other rows therethrough and delivering a row therefrom, the eggs while carried by the belt over the front of the driving roll 13 being held on the belt by means presently to be described. As shown in Figs. 2 and 4, the guide plates are formed so that the guide passages between them are gradually widened and arranged fanwise for spreading the rows of eggs as they are carried through said passages and to allow the eggs therein to fall on their sides upon the belt and to lie crosswise of said passages.

As best shown in Fig. 4, the guide passages formed between the intermediate sheet metal plates 50 have in their receiving ends spring tongues 55 extending and bent forwardly from the rear ends of said plates, and the guide channels formed between the outer plates 49 and adjacent plates 50 likewise have in their receiving ends spring tongues 56 attached to said plates 49. Said spring tongues 55 and 56 are wiped and flexed by the eggs as they pass into the guide passages, the eggs being squeezed slightly between said tongues and opposite walls of the passages, so that the eggs will be held more or less erect and with their long axes in planes approximately parallel with the movement of the belt until the eggs are moved past said spring tongues. The intermediate guide plates 50 are formed as shown in Fig. 4 for gradually widening and fanning out the passages therebetween to allow the eggs therein, after they have passed the spring tongues 55, to spread apart and fall on their sides upon the belt and be crosswise of said passages. The guide passages between the outer plates 49 and adjacent intermediate plates 50 are sufficiently wide to allow the eggs therein, after they pass the spring tongues 56, to assume postures and positions similar to the postures and positions of the others. The rubber cover on the driving roll 13 provides a cushioning support for the fragile eggs as they topple or fall from more or less erect to recumbent or prostrate postures on the belt while being carried thereby over said pulley.

Arranged between the guide plates, and over a part of the belt on the front of the driving roll or pulley 13, are curved guides consisting preferably of thin flexible sheet-metal cover strips 57, which serve in cooperation with the belt ribs 12 to hold eggs on the belt or between ribs thereof as the eggs are carried under said cover strips and until they are released for delivery. In the specific construction shown, said cover strips 57 and the vertical guide plates between which they are arranged cooperate with the belt on said roll to provide a series of arcuate conduits through which corresponding eggs of successively advanced rows are passed. The arrangement is such that the eggs of each row are retained on the belt until carried past the upper half of the front of the driving roll, or to a point on the front of said roll below its horizontal center. This provision in the illustrative machine is highly advantageous in that the eggs are delivered from the belt simply by rolling off and falling from ribs thereof, the delivery being non-dependent upon momentum, so that the eggs of successively delivered rows fall from the belt at substantially the same place, which is so located that the eggs can be received upon adjacent underlying means for cushioning them and transferring them to the candling support.

Said cover strips 57, attached at their upper and lower ends respectively to supporting cross rods 58, are so formed as to be very springy for cushioning the eggs as they roll thereagainst and for yielding to allow passage of oversized eggs. As will be apparent from Fig. 6, each row of eggs as it approaches the lower ends of the cover strips 57 is supported by said strips and one of the belt ribs 12. In every cycle of operation, a row of eggs will move past a position to be so supported, and will therefore fall from the belt, while a succeeding row of eggs will arrive at a position where it is still supported by the lower parts of the cover strips 57 and one of said belt ribs. For example, in Fig. 6 a row of eggs 10$^a$ has rolled off and dropped from the belt rib 12$^a$, while the next row of eggs 10$^b$ has arrived at a position where they are supported by the cover strips and the belt rib 12$^b$, said rib 12$^b$ being in a position (e. g. the position shown) where it would not alone support the eggs or prevent them from rolling off therefrom. As will be apparent, the movement of the conveyor belt following that which brought the rib 12$^a$ to the position shown in Fig. 6 will move said rib to a position where the eggs 10$^b$, being no longer supported by the cover strips 57, will roll off from said rib.

The eggs thus delivered by the conveyer belt 11 fall therefrom only a short distance, being received upon and cushioned by immediately subjacent means provided in this instance by a series of spring arms 59 (Figs. 3, 5 and 6) arranged between the several guide plates of the series of plates 49 and 50, said arms being affixed to and projecting forwardly from a rocker shaft 60 operable by the master lever 24 to swing said arms up and down between the two positions shown respectively in full lines and dotted lines in Fig. 6. Said spring arms 59 are shown as resilient sheet-metal strips bent as shown to form pockets to hold the eggs when the arms are raised. When the arms are lowered, the eggs roll from said pockets to the candling support.

The rocker shaft 60 has fixed thereon a depending bifurcated arm 61 straddling the link 44 between shoulders 62 and 63 adjustably fixed on said link (Figs. 3 and 4). On the forward throw of the master lever 24, said arm 61 is swung forwardly by the shoulder 63, thereby operating the rocker shaft 60 to swing said spring arms 59 upwardly to the dotted line position shown in Fig. 6. On the reverse or back stroke of said lever 24, said arm 61 is swung rearwardly by the shoulder 62, thereby operating the rocker shaft to swing said spring arms down. As said spring arms 59 swing up, the conveyer belt is moving forward. By appropriate adjustment of the shoulders 62 and 63, the swinging up of said spring arms may be timed so that they will catch and hold the eggs as they fall from the conveyer belt. If any of the eggs should drop prematurely or before the spring arms have been sufficiently raised to catch and hold them, they will nevertheless be caught and held on said spring arms by lodging against buffing means provided by a transverse tensioned spring cord 64 attached to the plates 45 and strung through holes therefor in the intermediate guide plates 50, which buffing means will hold such prematurely dropped eggs on the spring arms while they are swinging up and until they have been raised sufficiently to catch and hold the eggs. When said spring arms 59 are lowered to the position shown in full lines in Fig. 6, which movement occurs during the back stroke of the lever 24 and while the conveyer belt is at rest, the said spring arms serve as short runways down which the eggs roll to the candling support. The eggs roll to the candling support across the roller 65 and immediately assume positions for candling.

The spring arms 59, operated as described, provide resiliently yieldable means to catch and hold the eggs which fall from the conveyer belt and to release them to the candling support at the proper time. Specifically said spring arms provide in effect tiltable bottoms of delivery chutes or passages the side walls of which are provided by the vertical guide plates between which said spring arms are arranged, said delivery chutes or passages being the functional equivalent of tiltable chutes which in one position would hold the eggs and in another position deliver them. Said delivery chutes or passages receive the eggs from the preceding passages formed in part by the curved cover strips 57 over the front of the driving pulley 13. Thus the equipment associated with the delivery end of the conveyer is such that corresponding eggs of successive rows are successively advanced through curved passages on the front of the driving pulley and delivered therefrom to the candling support through continuing or succeeding passages in which the movement of the eggs is arrested until proper time for delivery.

Upon the candling support now to be described, the eggs of each row fed thereto are presented for candling with the eggs arranged end to end in spaced apart relation, as shown in Fig. 8. Said candling support comprises the rotating roller 65 and a lamp-supporting and housing structure cooperating with said roller to support the eggs for rotation thereby and for illumination of the rotating eggs, as shown in Figs. 6 and 7. Said roller 65, which is constantly motor-driven while the machine is in service, is desirably of rubber or rubber-covered, to avoid possibility of cracking the eggs as they roll thereacross and settle back thereagainst in positioning themselves for candling. The direction of rotation of said roller, indicated by the arrow associated therewith in Fig. 7, is such that the descending surface of the roller is at its front side.

Said roller 65 has a central shaft 66 providing roller trunnions which are journalled in bearings 67 (Fig. 4) supported by the frame side plates 2. The roller is driven by a sprocket claim 68 from a shaft 69, the latter being the driven shaft of an electric motor unit mounted in the motor case 70 supported by the bracket 71 from one of said frame side plates 2 (Fig. 3). Said unit comprises an ordinary fractional horse-power electric motor driving the shaft 69 through reduction gearing. The motor may be connected by ordinary means, as by a flexible electric cord detachably plugged to a wall socket, for operation of the motor by current from an ordinary house lighting circuit.

For illuminating the eggs on the candling support, the illustrative machine utilizes preferably a fluorescent electric lamp 72, which, as is well known, comprises a sealed glass tube containing a gas rendered luminous by electrical excitation, the same being removably mounted in supporting standards 73 containing insulated conductors connected with the lamp electrodes, said standards being affixed to a lamp base 74 which in the illustrative structure constitutes a rigidly attached but removable closure of a substantially rigid sheet-metal box 75 containing the electrical equipment for controlling the lamp (Figs. 6, 7 and 8). This type of lamp is desirable for obtaining high light without undue heat, and is also of advantage in permitting a compact lamp and housing structure. The lamp and its controlling equipment may be of conventional character and construction, though preferably its transformer, contained in the case 76 mounted in the controller box 75, is of somewhat greater wattage than that of the lamp itself, for the purpose of increasing the intensity of the light, though with some sacrifice of longevity of the lamp and necessitating somewhat more frequent replacements thereof than would be necessary if the transformer were of the same wattage as the lamp. The leads to the lamp, indicated at 77 in Fig. 8, may be connected to an outlet from a house lighting circuit in the ordinary manner, by detachably plugging a flexible lamp cord to a wall socket, whereby to maintain the lamp lit while the machine is in service.

The lamp 72, supported adjacent to and parallel with the roller 65, is enclosed by a lamp shield 78 of opaque material having a series of light apertures 79 over which the eggs are supported for illumination, said lamp shield, which straddles the lamp, being affixed to and supported by the lamp-supporting base 74 and cooperating therewith to provide the housing for the lamp. The eggs could be held on or against the roller 65 and over the light apertures by suitable rests in fixed relation to the lamp, but in this instance they bear directly upon the lamp shield 78 and are held thereby on said roller and over said apertures, the eggs so supported being rotated on their long axes and the rotating eggs being illuminated by light projecting through them from the lamp.

The lamp shield 78 utilized in the illustration structure is a resiliently flexible sheet-metal hood, preferably of sheet brass, of U-shaped cross section, and contains the lamp 72 adjacent to the U-bend, the curvature of the latter conforming approximately to that of the lamp tube but being of greater radius so as to provide a substantial space or large clearance between said tube and the lamp shield. The light apertures 79 are cut or punched out in the rounded or cylindric part of the lamp shield. The lamp-supporting and housing structure is so arranged that the eggs delivered to the candling support, rolling thereto across the rubber roller 65 land against said rounded part of the lamp shield, which resiliently flexes to cushion the eggs. The flexibility or springiness of the lamp shield is materially increased by forming it with the reverse bend 80. If the eggs lodge against the lamp shield with such momentum as to roll upwardly thereon and away from the roller 65, their upward movement will be checked by the hereinafter described rubber strip 85, or by the felt strip 81 if the removable cover carrying said rubber strip is not in place, and the eggs will roll back upon the rubber roll 65. The clearance between the lamp shield and lamp tube is such as to allow inward flexing of the shield without striking of the tube by such portions of the eggs as may be in the light apertures during such flexing.

As above stated, the light apertures 79 are cut or punched out in the rounded part of the lamp shield. Thus they are formed in a cylindric wall. These are relatively large light apertures of elliptical or ellipse-like form, arranged with their major axes parallel with the lamp as last shown in Figs. 8 and 19. Due to their size and form and the curvature of the wall in which they are formed, the configurations of the edges of said apertures are such that the eggs could seat in said apertures upon said edges if they were allowed to do so or if they were so held as to seat in that manner. But the relation of said apertures to the roller 65 is such that eggs of the ordinary sizes to be candled, e. g. hens' eggs, will assume positions such that they bear only on the upper edges of said apertures, at or near the highest points thereof, or on the cylindrical surface of the lamp shield above said upper edges. Said apertures are punched out in such manner that their edges are intruded or peened inwardly, thus avoiding sharp edges against which the eggs would scrape and providing smooth rounded bearing edges.

An excellent operating characteristic of the specific candling support disclosed is that the eggs received thereupon, though they may arrive more or less wobbling and lying more or less aslant to the roller 65, will almost immediately become aligned or arranged with their long axes about parallel with said roller and properly seated over the light apertures for candling. This is due to the rotation of the eggs and the shapes of the surfaces engaging and controlling their motions and positions. As the oval eggs are rotated by frictional engagement with the revolving cylindrical surface of the rubber roller, and bear on the rounded wall of the lamp shield or on edges of ellipse-like apertures therein, they will seek and almost immediately attain positions for engagement by said roller at the circles of their greatest diameters normal to their long axes, and so will assume postures for rotation on said long axes. If any egg bears initially on the upper edge of a light aperture at a substantial distance to one side of the center of said aperture, such edge will cam the rotating egg toward said center. And if the egg bears initially on the cylindrical surface of the lamp shield at a substantial distance to one side of such center, then the rotating egg will engage said upper edge at said side and be shifted thereby toward said center. Thus the general tendency is for the eggs to bear finally on the lamp shield at points substantially or nearly in line with the centers of the light apertures, with the effect that the eggs will quickly seat properly over and substantially cover said apertures, so that most of the light projected from the lamp through said apertures will pass through the eggs, with resultant high illumination thereof.

The direction of rotation of the roller 65 is such as to assist, if it were necessary, in the delivery of the eggs to the candling support and to preclude the possibility of displacing the eggs from said support by the rotation of the roller; while the opposite direction of rotation of the eggs by the roller is advantageous in that the surfaces of the eggs approaching their bearing points on the lamp shield are ascending surfaces, thus minimizing pressure of the eggs on said lamp shield and hence minimizing frictional resistance to rotation of the eggs.

The lamp-supporting and housing structure embodies a constructional feature whereby to permit easy removal of the lamp shield 78 when it becomes necessary to replace the lamp, for which purpose the lamp shield is slidably fitted on the lamp base 74 and detachable therefrom by endwise movement. As shown in Fig. 7, the lamp shield has its longitudinal edge portions flanged and affixed by welding to a pair of parallel stiff ribs or bars 82 which fit slidably but tightly in grooves provided by flanged portions 83 of the lamp base. Said bars 82 are pressed outwardly in said grooves by spring action of the lamp shield, which when detached holds said bars spread much further apart, so that they must be pressed inwardly or toward each other to permit inserting them into the ends of said grooves. Guides 83ª on the lamp base are slidably embraced by the portions of the lamp shield immediately adjacent to and carrying said bars 82. By frictional engagement of the tightly slidably interfitted parts mentioned, the lamp shield 78 is held against accidental displacement. By a fairly hard pull it can be detached. Likewise it may be replaced by inserting the bars into the grooves and pushing the shield into place.

As the eggs of a row are delivered to the candling support, they roll thereto between the guides or fenders provided by the forward portions of the series of vertical guide plates 49 and 50. By virtue of front extensions 85 of said guide plates over the lamp shield 78, the eggs are suitably fended to prevent endwise displacement thereof as they arrive on the candling support, and the eggs are presented for candling in separate compartments, which encourages and facilitates candling of the eggs individually or one by one and prevents interference with illumination of individual eggs by diffused light from adjacent eggs.

The crevices between the upper edges of the light apertures 79 and the overlying eggs are covered by a light shield provided by rubber strip 85 arranged over the lamp shield and having cut out portions to receive the eggs, said cut out portions being appropriately shaped for engagement of the edge portions thereof by the eggs. As the eggs delivered to the candling support arrive thereon, they may roll onto said rubber strip, which will arrest upward rolling thereof. The eyes of the candler are protected by said rubber strip from the glare of such light, mostly diffused or deflected, as may emerge between the edges of the light apertures and the under surfaces of the eggs seated thereover. Said rubber strip is affixed to and carried by a removable cover plate 86 mounted over the lamp-supporting structure as shown in Figs. 2, 3 and 9. Said cover plate is supported in notches 87 in the frame side plates 2 and upon a frame cross bar 88 to which said plate is removably fastened. In the cover plate 86 is a slot through which the master lever 24 extends and in which it is movable to and fro (Figs. 2 and 3). There is also shown, in a hole in the cover plate, a push button 89 by which the candler can control operation of the machine by a motor as hereinafter described. It is contemplated that the upper part of the master lever, constituting the handle thereof which extends through said slot in said cover plate 86, may be made as a separate part rigidly but detachably fixed to the lower part, so that said handle may be removed when the machine is to be operated by power.

Assuming the machine to be mounted at an appropriate elevation, the row of illuminated eggs on the candling support is positioned for convenient inspection by the candler, who, standing before the front end of the machine, may look downwardly or downwardly and forwardly upon the illuminated eggs without stooping or uncomfortably bend his head or body. What the candler sees is a row of six illuminated eggs arranged end to end in spaced relation, in separate compartments shielding each from the light of the others, and rotating on their long axes, the rotating illuminated eggs being exposed to view for their full lengths and for considerably more than half of their sides, thus permitting overall examination of the eggs for detection of air cells and other defects and imperfections, and enabling the candler to observe whether the eggs possess the desirable characteristic of mobility of the yolks within the whites. Presentation of the eggs in this manner is obviously highly advantageous for easy, quick and reliable candling of the eggs of one row from a filler lot. The eggs may be candled by observing the row of eggs or by observing the individual eggs in succession. Candling the eggs individually or one at a time, as is required in many plants and by the laws of some States, can be easily and quickly done with the use of the illustrative machine, wherein the presentation of the eggs in separate cells or compartments, shielding each from the light of the others, so frames and individualizes them as to suggest and induce such candling.

As the operation of the machine for discharging the candled eggs and feeding another row to the candling support is entirely under the control of the candler, he may take as much time as may be necessary for reliable candling of a row of eggs, or for careful inspection of any egg as to which he may be in doubt, or for removal and replacement thereof, while on the other hand he need not waste time since he can operate or cause an operation of the machine as soon as he has finished candling the row of eggs.

If as a result of candling the operator should find any egg to be defective or imperfect, he will remove it from the candling support and replace it by a previously candled perfect egg, which can be easily done by removing the defective egg from its cell with the fingers and placing the other therein. Upon any conveniently located table, there may be supported suitable pans or other vessels (not shown), one to contain previously candled perfect eggs to be substituted for rejected eggs, and the other to contain such rejected eggs.

The roller 65 is motor-driven at a suitable speed for rotating the eggs at an appropriate rate for candling. It is considered desirable to rotate the eggs at a rate of from forty to sixty revolutions per minute, preferably about sixty revolutions per minute or one revolution per second.

Discharge of the eggs from the candling support is accomplished by displacing a part of said support with the effect of releasing the eggs and allowing them to drop from said support. Specifically, the lamp-supporting and housing structure, normally in the position shown in Figs. 6 and 7 of the drawings, is displaceable forwardly or away from the roller 65, thereby separating or expanding the candling support and dropping the row of eggs therethrough. Said lamp-supporting and housing structure, comprising in this instance the box 75 and parts carried thereby, is mounted on a shiftable carrier presently to be described. The operation thereof, by which the candling support is expanded to drop the eggs and then restored to its normal condition, occurs on the forward stroke of the master lever 24, while the receiving conveyor 11 is advancing, during which time the spring arms 59 are going up to catch the row of eggs delivered by said conveyer.

The shiftable carrier for the lamp-supporting and housing structure, on which said structure is removably mounted, comprises in this instance a supporting shelf 90 (Figs. 6, 10 and 19) removably mounted on and swingably supported by a pair of rocker standards 91 rigidly affixed to and upstanding from a horizontal rocker shaft 92 (Figs. 3 and 5) whose bearings 93 are supported by the frame side plates 2. Certain details employed for convenience of construction in the illustrative machine are explained as follows: The substantially rigid sheet-metal box 75 carrying the lamp and its housing is permanently affixed to a plate 94 which is rigidly but removably fastened to the shelf 90 by attaching screws or bolts (Figs. 6 and 7). Said shelf 90 is a thick stiff sheet-metal plate having downturned end flanges 95 (Fig. 19) and an upstanding front stiffening flange 96, and having flaps 95a (Fig. 9) bent inwardly from said end flanges 95 and rigidly affixed to a flat bar 97. Said shelf with said flat bar so affixed thereto is rigidly but removably fastened by suitable screws or bolts to a cross angle bar 98 connecting the upper ends of the rocker standards 91. Said rocker standards are also connected intermediately of their ends by a cross angle bar 99.

The rocker structure just described and shown in perspective in Fig. 19 is held in its normal position by a spring 100 (Fig. 4), whereby the lamp-supporting and housing structure is normally held steady in the position shown in Fig. 6 of the drawings. In said normal position, the extended end portions 98a of the cross angle bar 98 abut a pair of stops 101 and 103 at opposite sides of the machine, for limiting backward swinging of the rocker structure (Figs. 3, 4 and 19). At the side of the machine shown in Fig. 3, the stop 101 is carried by a bracket 102 fixed to the front frame cross bar 88. At the opposite side of the machine, the stop 103, shown in Fig. 4 and also in dotted lines in Fig. 19, is carried by a bracket 104 attached to the adjacent frame plate 2.

As above indicated, the rocker standards 91 are rigidly fixed on the rocker shaft 92 to be rocked thereby for swinging the lamp-supporting and housing structure forwardly from the normal position. The master lever 24 has a bearing 105 on said rocker shaft, whereby said lever is fulcrummed on and coaxially with said shaft for swinging movement independently thereof (Fig. 3). Fixed on said rocker shaft 92 is a disc 106 having in its periphery a notch 107 which, when the master lever is in its rearmost position, is engaged by a spring-pressed pawl 108 carried by said lever. Said pawl has integral therewith a tripper arm 109 (Figs. 3, 4 and 5). As the master lever is swung forward from the rearmost position it turns the disc 106 and shaft 92 therewith, by virtue of engagement of the disc notch 107 by said pawl, until the tripper arm strikes a stop 110 fixed to the frame cross bar 111, whereupon, the pawl being tripped, the master lever continues its forward movement free of driving connection with the rocker shaft. By this means, the swingable carrier and the lamp-supporting and housing structure carried thereby are swung forward a sufficient distance for the dropping of the row of eggs through the candling support, which carrier is then pulled back by the retractile spring 100, thus promptly restoring the normal condition of the candling support.

To prevent a too sudden jerking back of the rocker structure by the spring 100 and consequent hard slamming of said structure against the stops 101 and 103, though these are cushioning stops, the back movement of said structure is resisted and made a gentle movement by means of a dash pot connected with said structure. As shown in Figs. 3, 5 and 19, the dash pot cylinder 112 is pivotally attached to the cross member 99 of said rocker structure, and the piston rod 113 is pivotally attached to a frame cross bar 114. It will be understood that as the rocker structure swings back, the dash pot piston compresses and expels air through a restricted outlet. The spring 100 is however sufficiently powerful to return the rocker structure with the parts carried thereby to normal position, against the resistance of the dash pot, by the time the master lever 24 completes its forward stroke.

The rows of eggs successively dropped from the candling support in successive cycles of operation of the machine are received in successively presented pockets or transverse channels of an underlying conveyer belt 115 which carries off the candled eggs and delivers them at the rear end of the machine, said delivery conveyer being arranged under the receiving conveyer 11 and movable step by step in the opposite direction (Figs. 1, 3 and 6). Said delivery conveyer 115 has uniformly spaced transverse ribs 116 forming said pockets between them, which pockets are sufficiently wide to allow the eggs rolling on their sides to enter them easily and to lie loosely therein in end to end relation.

The eggs fall from the candling support upon or against shock-absorbing means which checks the movement of the eggs and lets them down gently on the delivery conveyer, which means is provided in this instance by an apron 117 of canvas, rubber or other suitable material removably affixed to the under side of the lamp housing and arranged for the eggs to fall thereagainst and to roll thereon into the pocket of the delivery conveyer which is positioned to receive the eggs. Depending from the guide plates 50 are parallel sheet rubber guides 118 (Fig. 6) between the eggs fall against said apron, these guides being provided to prevent striking of the ends of the eggs against one another as they fall.

The delivery conveyer belt 115 is entrained at the front end on a driving pulley 119 fixed on a shaft 120 mounted on bearings supported by the frame side plates 2. At its rear or delivery end, said belt is entrained on a pulley 121 fixed on a shaft 122 mounted in bearings carried by the rear side plates 5. Said pulley 121 may be driven from the pulley 119 by a sprocket chain 123 engaging sprocket wheels on the pulley shafts, whereby said pulley 121 assists in driving the belt 115 and the latter is relieved from the strain of driving said pulley.

The upper run of the delivery belt 115 is supported in the same manner as the upper run of the receiving conveyer belt 11. Small supporting rollers for said upper run of the delivery belt 115 are indicated at 124 in Fig. 1. Adjacent to the longitudinal edges of said delivery belt are suitably supported guard rails 125 to prevent any eggs from rolling off from said edges of the belt or from the ends of the transverse pockets or channels between the belt ribs 116.

The master lever 24 is connected by a link 126 to a lever 127 pivoted coaxially with the driving pulley 119 and connected therewith by a clutch of the same type as that hereinbefore described, but reversely arranged (Fig. 3). The driving member of said clutch, to which said lever 127 is fixed is designated by the numeral 128 (Figs. 3, 4 and 5). The arrangement in this case is such that on forward movement of the master lever 24 the lever 127 swings forward therewith, free of driving connection with said pulley 119, while on reverse or back movement of said levers the lever 127 is clutched to the pulley shaft 120 for imparting its angular motion to said shaft and said pulley thereon. The pulley 119 is thereby turned in a clockwise direction, as viewed in Fig. 3, for moving the conveyer belt 115 rearwardly.

The angular movement imparted to the pulley 119 by the lever 127 on the backward swing is sufficient or if desired may be slightly greater than necessary for effecting one step movement of the conveyer belt 115, and the movement of the belt is arrested at the proper time by abutment of a belt rib 116 against a stop bar 129 swung into the path of said rib, as shown in Figs. 3 and 18, whereupon said pulley may complete its driven movement or continue to rotate by inertia while slipping within the belt. Said stop bar is fixed to and swingably carried by a pair of rocker arms 130 fixed on a rocker shaft which is shown mounted on bearings 132 carried by the vertical frame bars 133 affixed to the side plates 2 and connecting the cross bars 88 and 111. The rocker arms 130 are urged by a spring 134 in a direction to hold the stop bar 129 against the belt on the front side of the pulley 119. On the forward throw of the master lever 24, it engages an abutment 135 carried by one of said arms and moves the stop bar to position to release the belt for movement. On the return or back stroke of said master lever, the stop bar moves back against the belt in the path of the next belt rib. Thus the belt is controlled to move in each cycle of operation a proper distance for bringing a belt pocket to position to receive a row of eggs dropped from the candling support.

The conveyer 115 may deliver the candled eggs to apparatus for further handling them, such apparatus being represented in Figs. 1 and 2 by a delivery chute 136 only the receiving end of which is shown. In Fig. 1 there is indicated in dotted lines a curved hood 137 for holding eggs on the conveyer belt as they pass over and on the descending side of the rear pulley 121 to the delivery point, which hood is suitably supported in fixed relation to the machine frame. It is contemplated that the candled eggs will be delivered to apparatus for assembling them in filler lots for transference by a transfer tray into fillers in shipping or packing cases.

The operation of the machine is summarized as follows:

On the forward stroke of the master lever 24, the receiving conveyer 11 is advanced one step, being driven by the pulley 13 to which the clutch lever 32 imparts an appropriate angular movement. As said master lever is shifted from its rearmost to its foremost position, the following actions take place. The stop rod 41 is immediately swung down from the conveyer belt, releasing it for movement, while the stop rods 39 are swung upwardly, this action being quickly effected by the weight 42. The holders 59 swing upwardly to catch the eggs of the row being delivered or about to be delivered by said conveyer. The lamp-supporting and housing structure, which cooperates with the motor-driven roller 65 to support the row of eggs on the candling support, is swung forwardly, with resultant dropping of said row of eggs through the expanded candling support and deposit of said row of eggs in one of the pockets of the now stationary delivery conveyer 115, whereupon said lamp-supporting and housing structure swings back to normal position, restoring the candling support to its normal condition. Meanwhile the stop rods 39 are positively forced up against the under run of the receiving conveyer belt, in the path of adjacent belt ribs 12, so as to stop the movement of said belt when said ribs abut said stop rods.

During said forward stroke of the master lever, the clutch lever 127 associated with the driving pulley 119 of the delivery conveyer 115 swings forwardly with the master lever, free of driving connection with said pulley 119, so that the delivery conveyer remains at rest. Still another action which takes place on said forward stroke of the master lever is that, by pushing against the abutment 135, said lever forces and holds the spring-actuated stop bar 129 away from the belt 115 on the driving pulley 119, thus freeing said belt for movement.

On the reverse or back stroke of the master lever, the clutch lever 32 swings back free of driving connection with the driving pulley 13, so that the receiving conveyer 11 remains at rest, while the delivery conveyer 115 is moved rearwardly one step, being driven by the pulley 119 to which the clutch lever 127 imparts an appropriate angular motion. During such reverse stroke of the master lever, the following actions occur. The spring arms 59, having caught the row of eggs just delivered from the receiving conveyer 11, dip or tilt downwardly to deliver the eggs to the candling support, on which they immediately assume positions for candling. The stop rod 41 is forcibly swung up against the under side of the receiving conveyer belt 11 immediately behind and against one of the belt ribs 12, thereby preventing said belt from being deranged by moving it either accidently or intentionally in a direction for advancing it. And the stop bar 129 is let back against the belt 115 on the pulley 119, in the path of one of the belt ribs 116, whereby to stop the movement of the delivery conveyer belt when said rib abuts said stop bar.

In view of contemplated manual operation of the machine, stops are provided for limiting the movements of the master lever 24. Forward movement thereof is limited by a stop 138 carried by the frame's cross bar 111. Rearward movement of said master lever is limited by abutment of a rubber block 139 fixed to the back of said lever against the clutch member 128.

For operating the machine by power, there are shown for illustration the means now to be described.

The master lever 24 has integral therewith a tail extension or lever arm 140 connected by a link 141 to the wrist pin 142 of a crank wheel 143 fixed on a shaft 144 mounted in bearings 145 suitably supported by the underframing of the machine. The pin 146 may be removed for disconnecting the master lever from the link 141 when the machine is to be operated by hand.

Loose on the shaft 144 is a sheave or pulley 147 which is constantly driven from a motor. As shown, said sheave is driven from a motor-driven shaft 149 by a belt 148 engaging a sheave 149ᵃ fixed on 149. Said shaft 149 is the driven shaft of an electric motor unit the case 150 of which is suitably supported by the underframing of the machine. Said unit comprises a fractional horse power motor driving said shaft 149 through suitable reduction gearing contained in the motor case. The sheave 147 should be driven at an appropriate low speed, say from about thirty to sixty revolutions per minute, preferably about forty-five revolutions per minute. In this instance the motor unit employed has reduction gearing such that, although the rotor rotates at 1150 R. P. M., the shaft 149 rotates only 45 R. P. M.

To effect a reciprocation of the master lever 24, the constantly motor-driven sheave 147 is adapted to be clutched to the crank shaft 144 by a clutch controllable to release said shaft upon completion of one revolution thereof. The clutch utilized in this instance is a Hilliard fractional horse power single revolution clutch manufactured by The Hilliard Corporation of Elmira, New York, and shown in said corporation's bulletin No. 254 of April 1947.

Said clutch shown in Figs. 15 to 17, comprises a driving member 151 enclosing the driven member 152 and clutch rollers 153. Said driving member 151 is fixed to and rotatable with the sheave 147. As shown, said sheave is fitted on and keyed to the hub of said driving member which is rotatably fitted on the crank shaft 144. Thus the driving member 151 is continuously motor-driven. The driven member 152, which is fixed on said crank shaft, consists of a ring having peripheral flat surfaces 154 in planes normal to radial planes. The clutch rollers 153, arranged parallel with the clutch axis, are interposed between said flat surfaces and the surrounding cylindrical interior surface of the driving member 151. The rollers can be wedged between and gripped by the two clutch members, but are released from gripping engagement therewith when the rollers are at the middles of said flat surfaces. In the drawings, said rollers are shown in released position.

The clutch rollers 153 are held in spaced relation by a cage 155 loose on the shaft, said cage having projections 156 between which the rollers are confined. Retractile springs 157 are connected to and act between said cage and a collar 158 fixed on the shaft. These springs urge the cage in a clockwise direction relative to the crank shaft, so as to move the rollers 153 toward the leading ends of the flat surfaces 154. In other words, the springs 157 urge the cage to an angular position relative to the driven clutch member 152 such that the rollers will be positioned for clutching the driving member 151 to said driven member 152.

The cage 155 carries a projecting trip pin 159. Mounted adjacent to the clutch is a trip lever 160 normally spring-held in position to provide a stop in the path of revolution of said pin. As shown, said lever is arranged for abutment of said pin against the free end of said lever. When the pin strikes said lever, it stops the rotation of the cage, which remains stationary while the driven clutch member 152, under the momentum of the crank shaft, continues to rotate a short distance, in this instance five degrees, with resultant stretching of the springs 157 and change of relative position of the rollers to release position, thus declutching the driven member 152 from the driving member 151. A retractile coiled spring 165 attached at one end to a fixture 166 and at its other end to the crank wheel 143 functions to insure a continuing rotative movement of said driven clutch member 153 for said five degrees, after stoppage of movement of the cage 155, to effect release of the clutch. The clutch remains in released condition so long as the trip lever 160 remains in position for abutment of the pin 159 against the free end of said lever. Upon withdrawing said trip lever from the path of said pin, the tensioned springs 157 snap the cage to position to hold the rollers in driving or clutching position. The driving member 151 will thereby be immediately clutched to the driven member 152, and the crank shaft 144 will be driven from the motor by the clutch for one complete revolution or until the trip pin 159 again encounters the stop provided by said trip lever.

An electric-magnet controlled by the push button 89 is utilized for withdrawing the trip lever 160 from its normal operative position. As shown, said trip lever is pivoted to a fixed support 161 and is pivotally connected to the movable core 162 of a solenoid 163 suitably mounted in fixed relation to the machine frame. The trip lever is held in said normal operative position by the spring 164. The solenoid coil or winding is included in a normally open electric circuit (not shown) controlled by a push button spring held in open position and closable by pushing the button 89 thereof. Upon pushing the button, the circuit closes, with resultant energization of the solenoid, which withdraws the trip lever from position to obstruct movement of the trip pin 159, whereupon the crank shaft 144 becomes clutched to the constantly motor-driven sheave or pulley 147. Upon releasing the button, the circuit opens and the solenoid becomes deenergized, whereupon the spring 164 returns the trip lever to its said normal operative position, in which it provides a stop in the path of revolution of said trip pin, so as to effect declutching of said shaft from the motor-driven sheave when said trip pin strikes said stop.

From the foregoing it will be apparent that motor operation of the machine through a single cycle can be had at the will of the operator by pushing and immediately releasing the push button 89, which requires but a momentary pressure and lifting of the finger, and that successive cycles of operation by motor-actuation can be had with such frequency as may be compatible with careful candling of the eggs presented to the view of the operator in the rest periods between each such successive cycles of operation.

Obviously the details of the illustrative machine may be variously changed to suit different requirements and conditions. Moreover it is not indispensible that all of the features of the invention be used conjointly, since various features thereof may be advantageously used in various different combinations and sub-combinations.

I claim:

1. An egg candling machine having, in combination, a horizontally disposed motor-driven roller, a lamp comprising an illuminating tube disposed beside and parallel with said roller, a light shield consisting of a straight elongate hood parallel with and covering and enclosing said lamp and having a row of spaced light apertures opposite an upper part of the side of the lamp adjacent to the roller, the lamp being in near proximity to said apertures, and means supporting said lamp and shield in position for cooperation of said shield and roller to rotatably support over said apertures a row of eggs arranged end to end in spaced relation, said shield having a sloping wall portion in which said apertures are formed and against which the eggs rest with one-point sliding contact at or adjacent to the upper edges of said apertures.

2. A machine according to claim 1 wherein said sloping wall portion of the light shield in which the light apertures are formed is substantially cylindric, said apertures being of ellipse-like form and arranged with their long axes parallel with said roller and having intruded edges and being of sufficient size for protrusion of portions of the eggs thereinto, there being a substantial clearance between said cylindric wall portion and the lamp.

3. A machine according to claim 1 wherein said light shield comprises a resiliently flexible sheet metal hood of U-shaped cross-section straddling said lamp and having said light apertures in the U-bend of said hood, the lamp being partially within the U-bend, there being a substantial clearance between the lamp and U-bend.

4. A machine according to claim 1 wherein said supporting means includes a straight member parallel with and carrying said lamp and shield, said member and shield having tightly slidably interfitted guide portions parallel with the lamp, whereby the shield is affixed to said member in a manner to permit removal of said shield by endwise movement thereof.

5. A machine according to claim 1 having means comprising vertical plates associated with and arranged transversely of said roller to provide separate compartments open at the front and top in which the respective eggs are presented for candling.

6. A machine according to claim 1 having means for feeding eggs to the support constituted by said roller and light shield, said feeding means being adapted to hold a supply of eggs arranged in rows transverse of the direction of feed and to deliver them one row at a time, the machine being constructed and operating so that the eggs of each row so delivered roll to said support across said roller, said light shield being resiliently flexible to cushion the eggs lodging thereagainst, there being a substantial clearance between the lamp and light shield.

7. A machine according to claim 1 wherein the support constituted by said roller and light shield is expansible for dropping the eggs therethrough, said machine having a shiftable carrier for said lamp and light shield movable away from and back toward said roller for so expanding said support and restoring it to normal position.

8. A machine according to claim 1 having a movable carrier for said lamp and light shield spring-urged to hold them in normal position and movable to displace them from such position for dropping the eggs, and stop means limiting movement of said carrier in the direction in which it is spring urged.

9. In an egg candling machine, a candling support comprising a motor-driven roller and a lamp housing having a row of light apertures and cooperable with said roller to hold over said apertures a row of spaced eggs lying upon and rotated by said roller, said housing having a sloping wall portion in which said apertures are formed and against which the eggs rest with one-point sliding contact at or adjacent to the upper edges of said apertures, and light source means arranged in said housing for projecting light directly through said apertures and the eggs supported thereover.

10. In an egg candling machine, a candling support according to claim 9 having one of said roller and lamp housing stationarily mounted and the other mounted for movement transversely of said roller away from and back to supporting position for dropping the eggs from said support and restoring it to condition for supporting a row of eggs.

11. An egg candling machine having, in combination, a candling support comprising a motor-driven roller and a lamp housing having a row of light apertures and cooperable with said roller to hold over said apertures a row of spaced eggs lying upon and rotated by said roller, said lamp housing being displaceable from said roller for dropping the eggs, a shiftable carrier for said lamp housing whereby it can be so displaced and returned to normal position, and means for feeding eggs to said support comprising an endless conveyer adapted to support the eggs arranged in transverse rows and to be successively advanced for successively delivering said rows, said feeding means being arranged for feeding the eggs across said roller.

12. An egg candling machine according to claim 11 having longitudinally disposed fixed guide means cooperating with said conveyer whereby the eggs of each row are delivered therefrom in spaced relation and so positioned that they can roll in parallel paths to said candling support, and means providing inclined supports on which the eggs can roll to said candling support.

13. An egg candling machine according to claim 11 having longitudinal guides under which said conveyer travels and a series of vertically disposed guide plates associated with the delivering end of said conveyer and forming guide ways in continuation of those formed by said first mentioned guides, said conveyer having transverse channels in which to support the rows of eggs, said channels and first mentioned guides cooperating to form individual egg compartments in which the eggs rest on end and with the eggs of successive rows in similar relation to those of standard filler lots, and the passage ways formed by said guide plates being arranged to spread out the rows and to allow the eggs thereof to assume prostrate postures with their long axes transverse of the direction of travel.

14. An egg candling machine according to claim 11 wherein said conveyer comprises a belt and pulleys around which it travels at its opposite ends, said belt being formed with transverse channels in which to support said rows of eggs and there being curved guide means (e. g. 57) associated with the pulley at the delivery end of said conveyer to retain the eggs in said channels until they pass a certain position on the descending side of said pulley.

15. An egg candling machine according to claim 11 having a driving pulley for said conveyer, a lever pivoted coaxially with said pulley, and clutch means of the free wheeling type by which said lever is drivingly connected with said pulley only on movement thereof in one direction, means for reciprocating said lever through a certain angular traverse, and stop means cooperable with said conveyer for limiting the movements thereof, the conveyer being adapted to support the rows of eggs in appropriate spaced relation for successive delivery of said rows by successive step movements of the conveyer.

16. An egg candling machine according to claim 11 wherein the conveyer has uniformly spaced abutments arranged in succession longitudinally of the conveyer and having stop means coacting with said abutments in succession for limiting the movements of the conveyer to substantially the distance between centers of adjacent abutments.

17. An egg candling machine having, in combination, a candling support comprising a motor-driven roller and a lamp housing having a row of light apertures and cooperable with said roller to hold over said apertures a row of spaced eggs lying upon and rotated by said roller, one of said roller and lamp housing being movable away from and back to supporting position for dropping the eggs from said support and restoring it to condition for supporting a row of eggs, and means for feeding eggs to said support including an endless conveyer adapted to support the eggs in transverse rows and to be successively advanced for successively delivering said rows, said feeding means being constructed and arranged for delivering each row of eggs so that they roll to said support across one of said roller and lamp housing.

18. An egg candling machine according to claim 17 having a movable carrier for said one of said roller and lamp housing spring-urged to and held steady in supporting position but displaceable therefrom for dropping the eggs.

19. An egg candling machine according to claim 17 having a rocker carrying said lamp housing, the rocker being mounted for movement on an axis parallel with said roller, whereby the lamp housing can be swung away from said roller for expanding said support to drop the eggs therethrough, and spring means for returning said rocker to normal position.

20. An egg candling machine according to claim 17 having means comprising stationary longitudinally disposed guides cooperating with said conveyer for causing the eggs of each row to assume proper spaced relation and postures for rolling before they are delivered from said conveyer and having means onto which the eggs drop from said conveyer and on which they roll to said candling support.

21. An egg candling machine according to claim 17 having a pulley entrained by said conveyer at its delivery end and on the descending side of which said rows of eggs are successively carried, stationary longitudinally disposed guides cooperating with said conveyer whereby the eggs of each row so carried are arranged in proper spaced relation and enabled to lie crosswise of the direction of travel so as to be delivered from said conveyer postured for rolling to said support, and curved guides cooperating with said conveyer to support the eggs on the descending side of said pulley until they pass a certain position and to drop the eggs of each row on the step movement of the conveyer following that which brought them to said position.

22. An egg candling machine according to claim 17 having transfer means arranged to receive eggs from said conveyer and to deliver them to said candling support, said transfer means being movable between two positions and adapted in one position to catch and hold the eggs dropped from said conveyer and in the other position to release them for delivery to said support.

23. An egg candling machine according to claim 17 having transfer means arranged to receive eggs from said conveyer and to deliver them to said candling support, said transfer means comprising parallel arms upon which the eggs fall from said conveyer, said arms being movable on a transverse axis and adapted in one position to arrest the movement of the eggs and to dip from such position for delivering the eggs.

24. An egg candling machine according to claim 17 having transfer means arranged to receive eggs from said conveyer and to deliver them to said candling support, said transfer means comprising resiliently flexible sheet metal arms arranged under the place where the eggs drop from the conveyer, a rocker shaft carrying said arms which project forwardly from said rocker shaft, the arms being swingable upwardly and downwardly and so shaped that in their upper positions they catch and hold the eggs and in their lower positions they form inclined supports on and from which the eggs roll to said candling support.

25. An egg candling machine according to claim 17 having an off-bearing conveyer for eggs dropped from the candling support, said off-bearing conveyer arranged under the first mentioned conveyer and movable in the opposite direction.

26. An egg candling machine according to claim 17 having manually operable means operably connected with the movable parts of the machine whereby to effect at the will of the candler a cycle of operations in which the candling support expands to drop the eggs previously deposited thereon and resumes normal condition and a row of eggs is delivered to said candling support after it has resumed such normal condition.

27. An egg candling machine according to claim 17 having a crank and means controlled by the operator for causing a motor drive of said crank through a single revolution, said crank being operatively connected with the moving parts of the machine for effecting in each revolution a cycle of operation in which the candling support expands to drop the eggs previously deposited thereon and resumes normal condition and a row of eggs is delivered to said candling support after it has resumed such normal condition.

28. An egg candling machine having in combination, an endless conveyer adapted to support eggs in transverse rows spaced for successive delivery by successive step movements of said conveyer, a pulley about which said conveyer is entrained at its delivery end, guides whereby the eggs of each row as they are carried over and on the breast of said pulley are maintained in appropriate spaced relation and enabled to lie crosswise of the direction of travel, curved guide means cooperating with said conveyer to support the eggs on the descending side of said pulley until they pass a certain position, the arrangement being such that the eggs of each row drop on the step movement of the conveyer next after that which brought them to said position, transfer means to receive the eggs from said conveyer and to deliver them for candling, said transfer means comprising devices movable on a transverse axis and adapted in one position to catch and hold the eggs and to dip from said position for delivering the eggs by rolling thereof from said devices, a candling support arranged to receive the eggs from said devices, said support comprising a motor-driven roller and a lamp housing having a row of light apertures and adapted to support the eggs over said apertures and lying on their sides upon and rotated by said roller, said candling support being arranged for the eggs to roll thereunto across said roller, extensions of the first mentioned guides between which the eggs roll to said support, and a rocker carrying said lamp housing, said rocker being mounted for movement on an axis parallel with said roller and spring-urged to normal position and swingable forwardly therefrom for expanding said candling support to drop the eggs previously supported thereby.

29. An egg candling machine according to claim 28 having a member movable through a certain traverse from and back to a certain position, means operable by said member on the stroke thereof in one direction to advance the conveyer one step, means operable by said member on said stroke to displace said rocker and release it for return movement by spring action, and means operatively connecting said member and transfer devices whereby they move to position to catch the eggs in time to catch them when they drop from the conveyer and dip to position to release and deliver the eggs to the candling support on the reverse stroke of said member, whereby in every reciprocation of said member the candling support expands to drop the eggs previously deposited thereon and resumes normal condition and a row of eggs is delivered to said candling support after it has resumed such normal condition.

ELY BRAMSON.

REFERENCES CITED

The following references are of record in the file of this patent:

UNITED STATES PATENTS

| Number | Name | Date |
|---|---|---|
| 1,728,462 | Wyland | Sept. 17, 1929 |
| 2,070,980 | Wyland | Feb. 16, 1937 |
| 2,175,262 | Haugh | Oct. 10, 1939 |